(12) United States Patent
Lin et al.

(10) Patent No.: US 7,418,588 B2
(45) Date of Patent: Aug. 26, 2008

(54) METHOD AND APPARATUS FOR REDIRECTING A LOCAL BOOT REQUEST TO A REMOTE LOCATION

(75) Inventors: Ray-Hsin Lin, Taoyuan (TW); Ching-Tung Lu, Taoyuan (TW)

(73) Assignee: Jade Quantum Technologies, Inc., Taoyuan (TW)

( * ) Notice: Subject to any disclaimer, the term of this patent is extended or adjusted under 35 U.S.C. 154(b) by 442 days.

(21) Appl. No.: 11/027,449

(22) Filed: Dec. 28, 2004

(65) Prior Publication Data

US 2005/0144431 A1 Jun. 30, 2005

(30) Foreign Application Priority Data

Dec. 31, 2003 (TW) .............. 92137558 A

(51) Int. Cl.
G06F 9/00 (2006.01)
G06F 9/24 (2006.01)
G06F 15/177 (2006.01)
G06F 15/16 (2006.01)

(52) U.S. Cl. .............. 713/2; 713/1; 709/217; 709/219

(58) Field of Classification Search ............ 713/1, 713/2; 709/219, 224
See application file for complete search history.

(56) References Cited

U.S. PATENT DOCUMENTS 5,577,210 A * 11/1996 Abdous et al. .............. 709/219
5,974,547 A * 10/1999 Klimenko .................. 713/2
6,282,641 B1 * 8/2001 Christensen ................ 713/2
6,463,530 B1 * 10/2002 Sposato ..................... 713/2
2004/0078521 A1 * 4/2004 Hawks et al. ............... 711/118
2004/0267926 A1 * 12/2004 Rothman et al. ........... 709/224

OTHER PUBLICATIONS

Spooner, John G., 'IBM offers data storage alternative,' CNET News.com, May 30, 2002.*
Bartonmj21, 'Why I like, and own, companies like IBM, FLSH, LSI and not EMC, SUNW,' Google Groups, Jun. 1, 2002.*
iBoot-Remote Boot over iSCSI, IBM Israel.*
Nik Simpson, 'iSCSI v. SoIP,' Google Groups, Jun. 27, 2001.*

* cited by examiner

Primary Examiner—Thomas Lee
Assistant Examiner—Jaweed A Abbaszadeh
(74) Attorney, Agent, or Firm—Alan Kamrath; Kamrath & Associates PA

(57) ABSTRACT

A method and an apparatus are provided to remote boot a diskless computer on a WAN. The remote boot apparatus is constructed as an embedded interface in the computer. The remote boot apparatus has a bi-directional buffer, a central processor, a network interface, a boot ROM and ail interface core routine. The remote boot apparatus intercepts a normal disk read of an MBR issued by a system BIOS of a local computer, and then redirects the disk instruction in a form of TCP/IP packet to a remote boot server to read a corresponding file block from a location of the remote boot server. After the file block is received and confirmed by the computer, the received file block is unpacked and supplied to boot the computer.

9 Claims, 4 Drawing Sheets

METHOD AND APPARATUS FOR REDIRECTING A LOCAL BOOT REQUEST TO A REMOTE LOCATION

BACKGROUND OF THE INVENTION

1. Field of the Invention

The present invention is related to a method to remote boot a diskless computer, and more particularly to a remote boot technique that intercepts the disk interrupt requests, converts these requests to TCP/IP packets, and sends the packets to a remote boot server and deriving an operating system (OS) to boot a local computer.

2. Description of Related Art

An operating system (OS) is a software program that is used to manage the operation of all components in a computer system, and provides an operation platform through which users are able to control a variety of software and hardware. For instance, users can access data stored in hard disks, or design an application program to be executed by a central processor and then have the operation results displayed on a monitor screen.

When the personal computer is activated, the computer needs a special program, called a boot loader, which is directed by the BIOS (Basic Input Output System), to initialize the OS. Thereafter, the operating system can take full control of all components in the computer.

Computer users or managers have to spend a considerable amount of time learning how to use the personal computers and manage all the resources in the computers. Large enterprises are concerned with drastic costs of the system down time and the failure rate, and so the system installation and maintenance have become a daunting task in day-to-day operation of the information processing department. Without proper maintenance, all kinds of problems may occur.

System designers came up with a server-client configuration, where the server end had a hard disk large enough for holding the operating system, application programs and user data. In the aspect of the client station, each client station can individually boot the OS without any disk devices. It is noted that application programs are downloaded from the server end and independently executed in each client station resulting in higher operating efficiency. Further, because the client stations do not need physical disk devices (hard disk drives), the failure possibility of hardware can be reasonably reduced. Since the OS and application programs for client stations had been installed in the server end, users can simply operate computers just by activating the power even though they are not familiar with any installation skill of the OS. Such a server-client configuration may be more suitable for large enterprises, schools and home users.

This remote boot technique was first introduced by Novell Inc. However, the remote boot was only limited to terminal mode and the text operation mode at that time. While the users controlled the computer operation through keyboard input, the application programs were actually executed in the main server. As a result, the system efficiency is inversely proportional to the amount of client stations being connected on line.

Later, Novell Inc. introduced the RPL (Remote Program Load) system and Intel Corporation also put out a PXE (Preboot eXecution Environment) system, both using remote boot technology and able to support graphic mode operation.

The main objective of the present invention is to provide a method to remotely boot a diskless computer over wide area network (WAN), including a local area network.

However, the biggest problem of the above RPL and PXE systems is that these systems can only be operated in a local area network (LAN) environment. The RPL system relied on data broadcasts through the network to find a boot server, and the PXE system used a DHCP (Dynamic Host Configuration Protocol) to obtain the necessary IP address and then use that to make connection to the server. But when the target server is beyond the limits of a network router or a virtual local area network (VLAN), an agent/proxy server or a transparent router is needed to enable the personal computer to access the boot server from a different network. However, the addition of either the proxy server or transparent router will add to the equipment cost and slow down the system performance.

RPL and PXE systems need to work with the operating system to produce the image files. When the personal computer is turned on, the BIOS or the Option ROM on a network interface card is initiated to use Trivial File Transfer Protocol (TFTP) to download the necessary image files from the boot server. The operating system can only be initialized once the image files are ready, and then the remote network connection program can be started. However, the image files have to meet the special requirements of different operating systems, for instance, different languages.

The conventional remote boot only provides the basic network connection function, without the error recovery and data restoration functions. Therefore, the chance of data loss in transmission is increased. When errors are detected during transmission of image files in the network connection mode, the complete image file needs to be resent, thus the system performance is slowed down.

In a conventional remote boot, both the server and the personal computer are controlled by the network file system (NFS). Even though the personal computer may create a network disk, the network disk still employs file-oriented data exchange. When the user needs a certain file, an access request is first passed through the operating system to a file system layer to convert to the disk instruction. Then, a network file system layer encapsulates the disk instruction in the TCP/IP packet and then sends the packet to the server through the network interface. When the server receives the disk instruction packet, the packet is passed to the file system layer to find the corresponding network disk, and after unpacking the packet format the disk instruction is passed to the actual disk where the requested file is stored and the disk read instruction is executed to get the data from a predetermined file block. However, the whole process has to go through many data conversion processes, which is a waste of the system resources. As described above, the conventional remote boot technique still has drawbacks needed to be solved.

SUMMARY OF THE INVENTION

The main objective of the present invention is to provide a method to remotely boot a diskless computer over wide area network (WAN), including a local area network.

To this end, the method in accordance with the present invention comprises the acts of:

the boot apparatus intercepting an interrupt request sent to a disk drive issued from the local computer;

converting the interrupt request into a TCP/IP packet;

sending the standard TCP/IP packet through a network transmission channel to the boot server so as to read an actual file block where a program is stored;

returning the program in a form of a reply packet to the personal computer;

receiving and verifying the reply packet from the boot server by the local computer; and unpacking the reply packet to derive the program.

The above data exchange with the remote boot server is based on Internet Protocol (IP) technology. Therefore the personal computer can connect to a remote boot server on a WAN, crossing over the limits of local area networks. After setting up the boot firmware with appropriate network parameters, the personal computer is able to reach any point on the WAN to locate the remote boot server, and then make connection to the remote boot server.

The above data exchange employs iSCSI (Internet Small Computer Systems Interface), which is a communications protocol in conformance with TCP/IP specifications. The iSCSI protocol is used to encapsulate the data in TCP/IP packet, which enables a computer to make connection with any network computer and storage devices supporting Internet protocol (IP). The iSCSI protocol can ensure reliable data transmission and high efficiency, as the error detection and data restoration functions are built into the iSCSI specifications. Thus, the remote boot in accordance with the present invention possesses the characteristics of high reliability and efficiency.

The above data exchange can be implemented through any network transmission media compliant with TCP/IP protocol, such as Ethernet, fiber channel, or in asynchronous transmission mode (ATM). The data exchange is not necessarily bound by a current network structure, as long as the network bandwidth is able to support high speed data communications on the WAN.

The above data exchange in the present example is based on file blocks, but the data storage format shall not affect the remote boot, as the remote boot server directly processes the disk instruction, without using the network file system, or image files. The present invention only needs a suitable driver program, and boot loader, that can be operated on different operating systems.

Yet another objective of the invention is to provide a remote boot apparatus, which can be constructed either as an embedded interface in the personal computer or an adapter connected to the personal computer. Through the remote boot apparatus, the personal computer is able to make connection to the remote boot server on the WAN for remote booting.

The remote boot apparatus is hardware independent, so it is not necessary to modify the current BIOS or option ROM of the personal computer; instead, a driver program in the boot ROM is executed during the system boot. Therefore, the remote boot apparatus is compatible with different personal computers, and whatever network adapters or motherboards are currently used on personal computers.

To this end, the remote boot apparatus comprises:

a central processor responsible for system control, processing instructions of a core firmware and controlling data flow;

the core firmware, in conjunction with the central processor, responsible for packing and recording data and interrupt requests, unpacking data packets, verifying the accuracy of the data packets, and automatically recovering data packet;

a bi-directional buffer, connected to a first input/output port of the central processor, to save disk and data request commands from a local computer and data responded from a remote boot server;

a network interface, connected to a second input/output port of the central processor, for linking to the remote boot server to transmit and receive the data packets; and a boot firmware, which is applied to assist booting of an operating system (OS) for the computer, provides an interrupt routine that intercepts the OS booting commands, retrieves an actual file block from the remote boot server, and provides an interface program for setting up network parameters.

The above apparatus uses an interrupt routine in the boot firmware to intercept the normal disk read issued from the BIOS, generates a corresponding disk instruction in the TCP/IP packet format with the network controller chip, and then makes a connection to a remote boot server on the remote end through the network interface, and then waits to receive the requested file block with a Master Boot Record (MBR), which will be loaded into the system memory, and thereafter the system can use the OS loader to bring in the rest of the operating system, thus finishing the system boot procedures.

Since the above apparatus is constructed either as an embedded interface card or adapter with its own processor, the processing of TCP/IP packets can be handled by the interface card or adapter independently, without going through the personal computer, so the processor load of the personal computer can be reduced, and the delay in the system boot process can be kept to a minimum.

Through the remote boot, the personal computer does not need a hard disk nor maintain one, reducing the failure rate considerably. Also, the installation procedures for the personal computer can be considerably simplified, making the personal computer easy to operate like home appliances. Such systems are especially suitable for large enterprises and in a distant learning environment.

As user only need to turn on the computer equipped with the remote boot apparatus, and the operating system and application programs will be download automatically from the remote boot server, users no longer need to carry a portable computer or disk wherever they go. Instead, they can use any computer that enables them to log onto the Internet and download the necessary files from the remote boot server.

The present invention enables a personal computer to share the resources of a server which manages all the computer resources, such as the operating system, application programs and user data files in large capacity data storage. The personal computer only needs a remote boot apparatus to remote boot and connect to the server, so that the personal computer can bring in the operating system and the application programs for local program execution. The present invention can be a model for future computer designs, as the personal computer only needs to maintain minimal hardware and software, with or without a hard disk.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
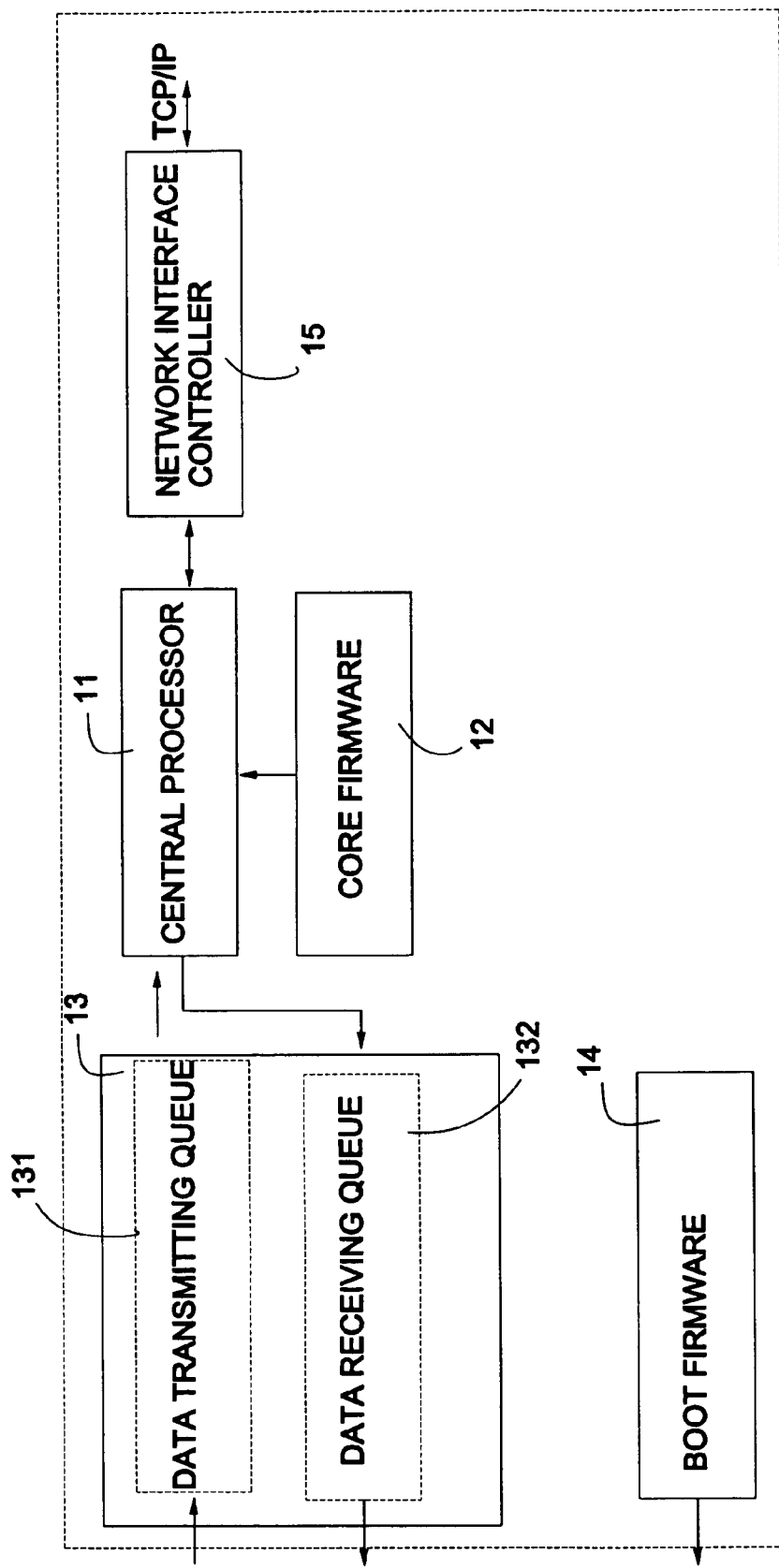
FIG. 1 is a block diagram of the system architecture of the present invention.

A remote boot apparatus according to the present invention can be constructed either as an interface card in a personal computer (PC) or an adapter for connection to the personal computer. In the preferred embodiment, the remote boot apparatus of the present invention is implemented as an interface card plugged into one PCI slot on a main board of the personal computer, but not limited to a PCI interface. The components of the interface card, as shown in FIG. 1, comprise:

a central processor (11) responsible for system control, processing instructions of a core firmware (12) and controlling data flow;

the core firmware (12), in conjunction with the central processor (11), responsible for packing and recording data and interrupt requests, unpacking data packets, verifying the accuracy of the data packets, and automatically recovering data packet;

a bi-directional buffer (13), connected to a first input/output port of the central processor (11), to save disk and data request commands from a local computer and data responded from a remote boot server, a boot firmware (14), which is applied to assist booting of an operating system (OS) for the computer, provides an interrupt routine that intercepts the OS booting commands, retrieves actual file block from the remote boot server, and provides an interface program for setting up network parameters; and a network interface controller (15), connected to a second input/output port of the central processor (11), for linking to the remote boot server to transmit and receive the data packets.

The bi-directional buffer (13) includes a data transmitting queue (131) and a data receiving queue (132). The data transmitting queue (131) receives disk interrupt requests issued from the PC. The disk interrupt requests are intercepted and processed by the central processor (11) and then transmitted to and executed by the remote boot server. The data receiving queue (132) is to receive reply data packets from the remote boot server. Actually, when the reply data packets are received by the network interface controller (15), these packets are first processed by the central processor (11) and then temporarily saved in the data receiving queue (132) in wait for the boot firmware (14) to retrieve the packets. After the operating system has been successfully loaded in the PC, the data packets stored in the data receiving queue (132) are then able to be retrieved by driving programs.

The core firmware (12) is used to boot the operating system and executing an initiating process. When the core firmware (12) is loaded in the PC, the system then enters a data-monitoring mode. If data to be processed are detected in the data transmitting queue (131), the core firmware (12) will read the first record in the data transmittina queue (131) and temporarily stored in an appropriate designated memory. Then, a protocol conversion program is called to convert the record into a packet format in conformance with the standard network protocol. The standard network protocol packet is then transmitted to a buffer of the network interface controller (15), and waiting for to be sent out to the remote boot server through a network system.

If there are reply data packets coming from the remote server through the network interface controller (15), the core firmware (12) executed by the central processor (11) designates an appropriate memory address for saving that reply data packets, and then calls the protocol conversion program. The central processor (11) first examines whether the reply data packets are valid. Then, the central processor (11) checks whether there is any disk interrupt request waiting. If the command table shows at least one disk interrupt request exists in the buffer, the reply data packets are unpacked. These unpacked data in company with the disk interrupt request are both saved in the data receiving queue (132) waiting for the PC to fetch these data and request.

Figure 2A:
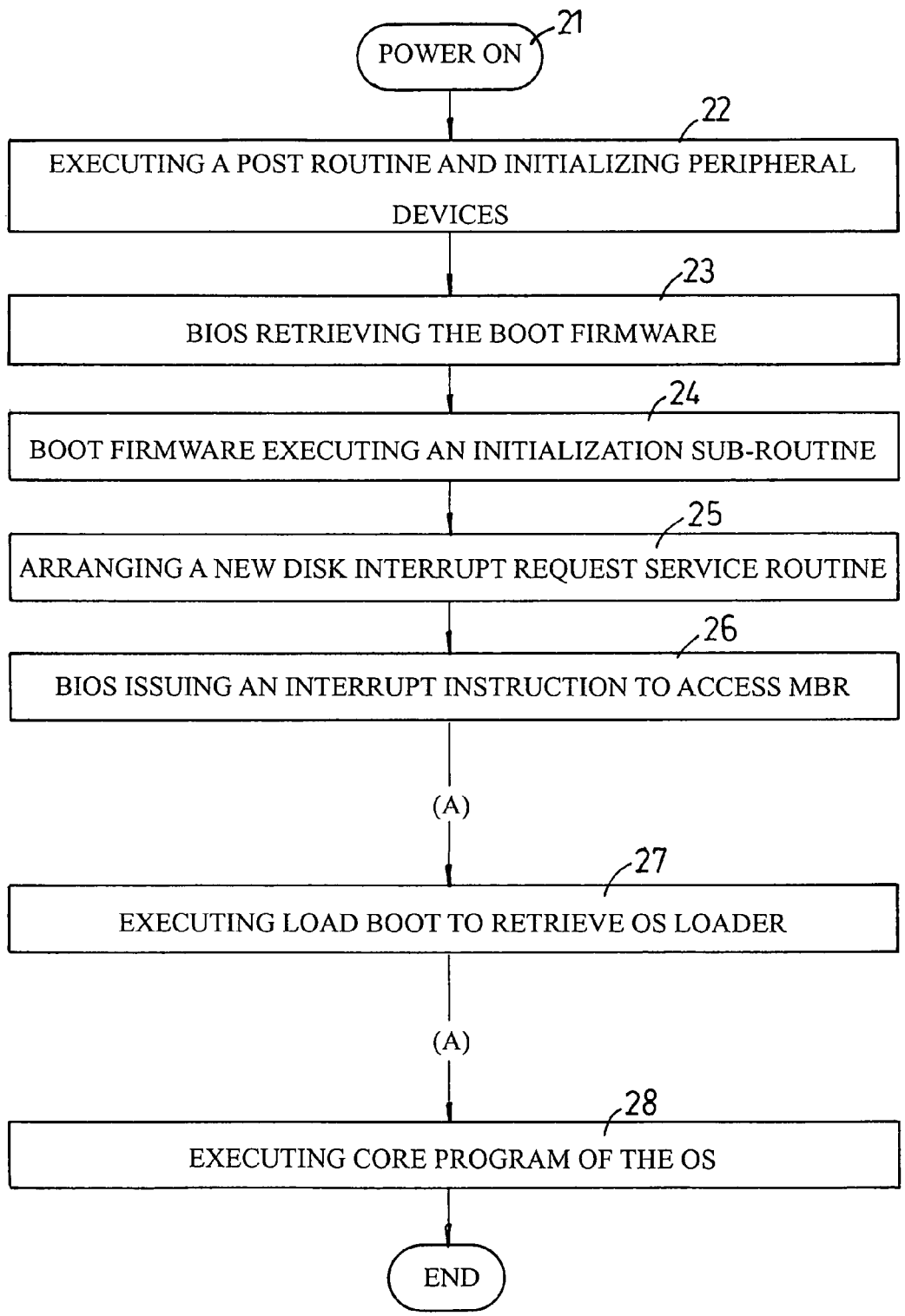
FIGS. 2A and 2B show two operation flows respectively for the personal computer and the remote boot apparatus during remote boot.
Figure 2B:
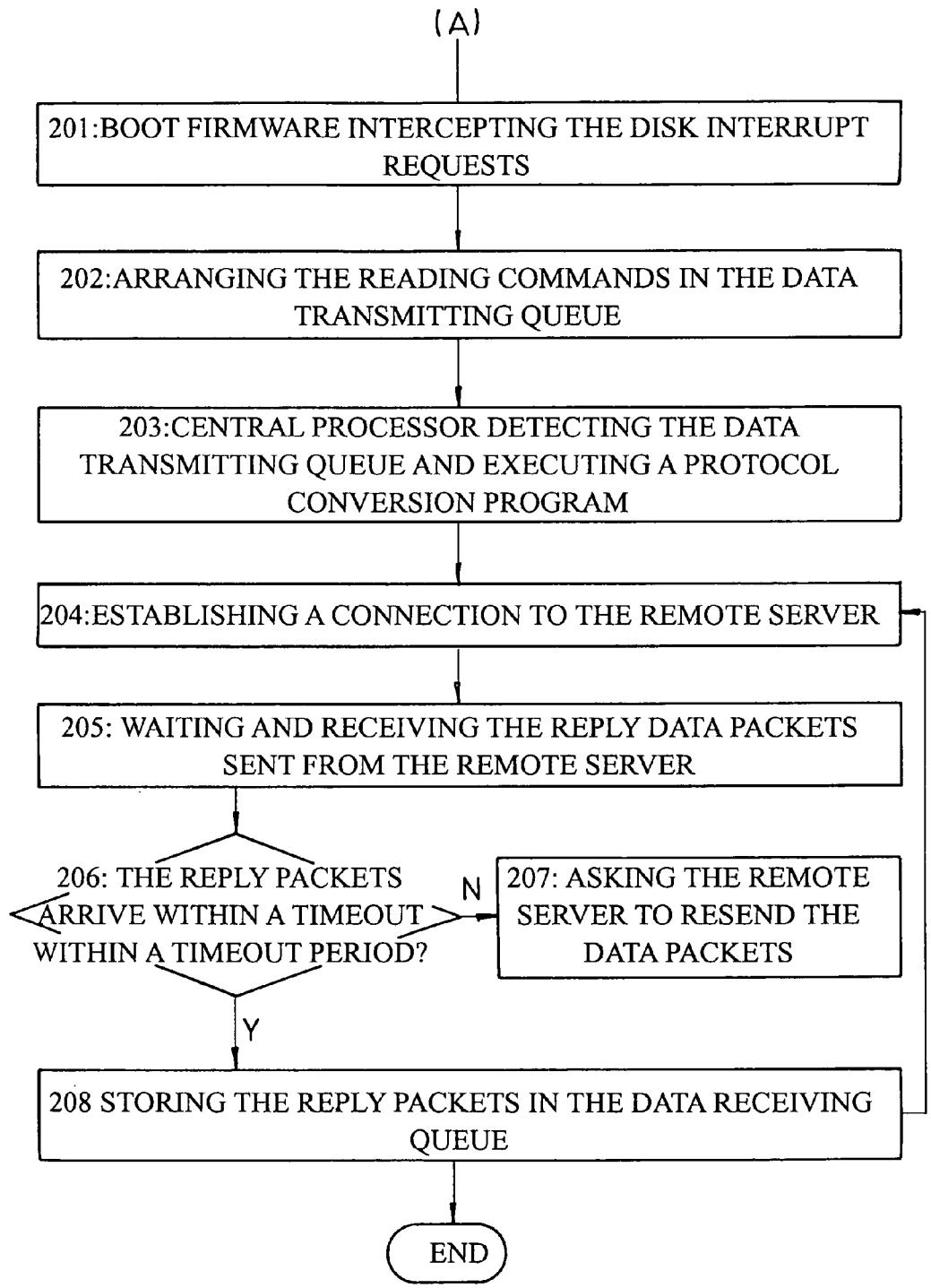

The interaction between the interface card and the PC is clearly shown by FIGS. 2A-2B. The booting procedures on FIG. 2A are executed by the PC, while the procedures on FIG. 2B are the interactions between the boot apparatus and the PC.

When the personal computer is activated (step 21), the PC system first enters a power on self-test routine (POST) to initialize all peripheral devices (step 22). According to the BIOS standard, the BIOS of the PC loads the boot firmware (14) in a main memory (step 23). The boot firmware (14) loaded in the main memory will execute an initialization sub-routine (step 24). During the initialization process, the boot firmware (14) checks whether the PC is successfully connected to the remote server and declares the amount of the available remote disk devices. The identification information of these available remote disks are registered in a Boot Connection Vector (BCV) table of the BIOS, such that the system BIOS is able to call the boot firmware (14) of the interface card to arrange a new interrupt service routine (step 25). Thereafter, the control is returned to the BIOS. The system BIOS issues an interrupt request to access the Master Boot Record (MBR) (step 26), and assigns a proper memory location for saving data and identification information of the available remote disk devices.

With reference to FIG. 2B, the boot firmware (14) on the interface card intercepts the disk interrupt requests (step 201). These disk interrupt requests are properly arranged in the data transmitting queue (131)(step 202). Then, when the central processor (11) detects at least one record, i.e. the disk interrupt request, indeed exists in the data transmitting queue (131), the central processor (11) calls the protocol conversion sub-routine (step 203) to convert the record to standard network packets (hereinafter command packets) and pass the command packets to the network interface controller (15). Through the network transmission channel, the command packets are sent to the remote server (step 204). In response to the command packets, the remote server will provide and send data packets to the PC. Meanwhile, the core firmware (12) then causes the PC to enter a waiting mode to wait for the reply data packets (step 205). During this waiting duration, the central processor (11) uses a preset timeout period to check to check whether the reply data packets are able to arrive within the timeout period (step 206). If the reply data packets are not received within the timeout period, the central processor (11) will request the remote server to re-send the data packets (step 207). If the reply data packets arrive before the timeout period expires, the reply data packets will be processed and be temporarily saved in the data receiving queue (132) (step 208), waiting for the boot firmware (14) to fetch the data packets and saved to the assigned memory.

Thereafter, the system BIOS executes a load boot program based on the main disk partition table so as to retrieve an operating system loader (OS loader) (step 27). However, such a disk interrupt request is still intercepted by the boot firmware (14) until the reply data packets are successfully loaded in the data receiving queue (132) (step 208) and the retrieved OS loader is loaded in the memory to execute operating system core program thus completing the OS boot procedures.

Figure 3:
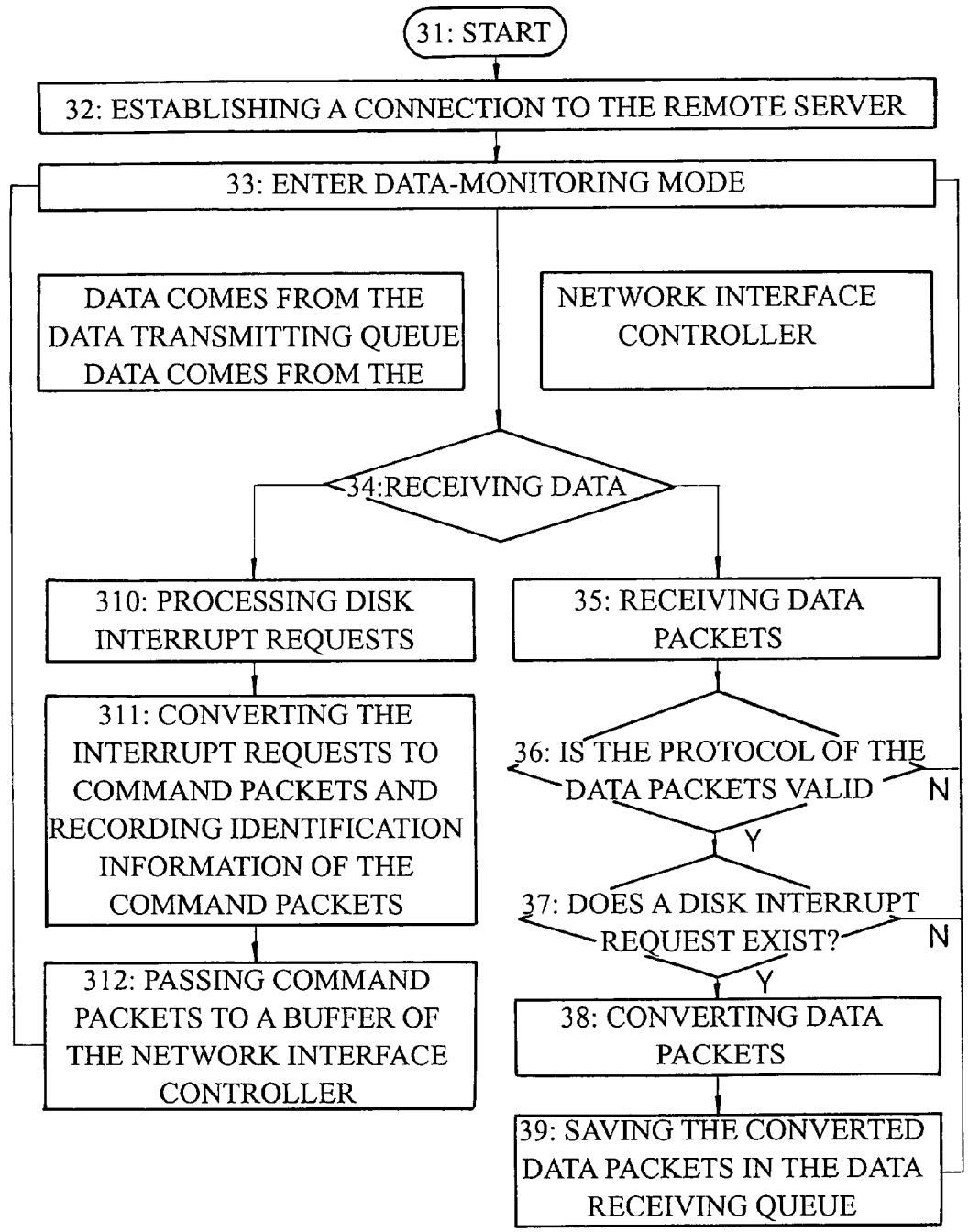
FIG. 3 is a decision chart used by the central processor of the remote boot apparatus during remote boot.

The operation flow of the central processor (11) during remote boot is shown in FIG. 3. The central processor (11) is created on the interface card. When a personal computer is activated, the interface card is enabled. First, the interface card enters an initialization stage (step 31), in which all peripheral devices are initialized at this time. Then, the apparatus makes connection to the remote boot server through network system (step 32). According to the preset network parameters, the system is able to successfully connect to the remote boot server, where the parameters for network connection and system settings can be dynamically set and verified. After establishing the remote boot server connection, the central processor (11) enters a data-monitoring mode (step 33). If no data requests come in, the central processor (11) remains in the data-monitoring mode until the core firmware (12) detects that new record to be processed exists in the bi-directional buffer (13) or that when the network interface controller (15) sends any data packet processing request. In such case, the central processor starts to receive data (step 34).

If data come from the data transmitting queue (131), the central processor (11) determines whether the data are disk interrupt requests, and appropriate memory space is allocated for saving the interrupt requests. Then, the central processor (11) starts to retrieve the first record in the data transmitting queue and calls an interrupt request processing program (step 310) to examine the format validity of the retrieved interrupt requests. For example, if the data length of interrupt requests exceeds the tolerable length, it will be sliced into several sections. Thereafter, the central processor (11) calls the protocol conversion program that converts the interrupt requests to command packets and records the identification information, such as the serial number and sequence order (step 311), of these command packets in a command table for use by the core firmware (12). Thereafter the command packets are passed to a buffer of the network interface controller (15) (step 312).

When the data packets come from the network interface controller (15), the central processor (11) receives the data packets (step 35), and checks whether the protocol of the data packets is valid (step 36). If it is the correct format, the central processor (11) determines if there is any disk interrupt request waiting by checking said command table (step 37). If disk interrupt request to be processed is indeed waiting, the protocol conversion program is called to convert the data packets (step 38). The converted data packets are appended to the corresponding disk interrupt request and are temporarily saved in the data receiving queue (39) waiting for the system BIOS to fetch the data.

What is claimed is:

1. A method to boot a local computer via IP networks, wherein the local computer is connected with a boot apparatus, the method comprising:
   checking connection status between the local computer and the remote boot server, wherein the remote boot server declares the available remote disk devices;
   registering identification information of the available remote disk devices in a boot connection vector (BCV) table of a system BIOS;
   intercepting by the boot apparatus an interrupt request being sent from the local computer to a disk drive;
   using an Internet Small Computer Systems Interface (iSCSI) protocol for data transmission, wherein data transmission is based on standard file blocks;
   converting the interrupt request into a TCP/IP packet;
   sending the standard TCP/IP packet through a network transmission channel to the remote boot server to read an actual file block where a program is stored;
   returning the program in a form of a reply packet to the local computer;
   receiving and verifying the reply packet from the remote boot server by the local computer; and
   unpacking the reply packet to derive the program.

2. The method as claimed in claim 1, wherein when the local computer is actuated, the method further comprises:
   initializing by the local computer all peripherals connected to the local computer and
   executing a self-test routine;
   retrieving by the system BIOS of the local computer a boot firmware of the boot apparatus and executing an initialization sub-routine;
   arranging a new interrupt service routine;
   the system BIOS issuing the interrupt request, wherein the interrupt request intends to read a master boot record (MBR) and is intercepted by the boot apparatus; and
   assigning a memory location for saving data and parameters.

3. A method to boot a local computer via IP networks, wherein the local computer is connected with a boot apparatus, the method comprising:
   the boot apparatus intercepting an interrupt request being sent from the local computer to a disk drive;
   converting the interrupt request into a TCP/IP packet;
   sending the standard TCP/IP packet through a network transmission channel to the remote boot server to read an actual file block where a program is stored;
   returning the program in a form of a reply packet to the local computer;
   receiving and verifying the reply packet from the remote boot server by the local computer;
   unpacking the replay packet to derive the program;
   when the local computer is actuated, the local computer initializing all peripherals connected to the local computer and executing a self-test routine;
   a system BIOS of the local computer retrieving a boot firmware of the boot apparatus and executing an initialization sub-routine;
   the boot firmware checking connection status between the local computer and the remote boot server and declaring the amount of available remote disk devices;
   registering identification information of the available remote disk devices in a boot connection vector (BCV) table of the system BIOS;
   arranging a new interrupt Service routine;
   the system BIOS issuing the interrupt request, wherein the interrupt request intends to read a master boot record (MBR) and is intercepted by the boot apparatus; and
   assigning a memory location for saving data and parameters;
   wherein after the interrupt request is intercepted by the boot firmware of the boot apparatus, the method further comprises: the boot firmware creating an access command and saving this command to a first buffer;
   the boot apparatus detecting whether the first buffer has at least one access command stored therein waiting to be processed;
   converting the access command to a packet of a communication protocol;
   transferring the packet via internet to the remote boot server;
   the boot apparatus detecting whether there is any data sent back from the remote boot server; and
   receiving the data sent from the remote boot server and storing the received data in a second buffer, wherein the received data in the second buffer is waiting to be retrieved by the boot firmware and saved to the assigned memory location.

4. The method as claimed in claim 3, further comprising using an iSCSI (Internet Small Computer Systems Interface) protocol for data transmission.

5. The method as claimed in claim 3, wherein data transmission is based on standard file blocks.

6. A remote boot apparatus installable as an adapter to a computer, the remote boot apparatus comprising:
- a central processor responsible for system control, processing instructions of a core firmware and controlling data flow;
- the core firmware, in conjunction with the central processor, responsible for packing and recording data and interrupt requests, unpacking data packets, verifying the accuracy of the data packets, and automatically recovering data packet;
- a bi-directional buffer, connected to a first input/output port of the central processor, to save disk and data request commands from a local computer and data responded from a remote boot server;
- a network interface, connected to a second input/output port of the central processor, for linking to the remote boot server to transmit and receive the data packets, wherein the transmitting and receiving data packets uses an iSCSI (Internet Small Computer Systems Interface) protocol;
- a boot firmware checking connection status between the local computer and the remote boot server, wherein the remote boot server declares the available remote disk devices;
- registering identification information of the available remote disk devices in a boot connection vector (BCV) table of the system BIOS; and
- the boot firmware, which is applied to assist booting of an operating system (OS) for the computer, provides an interrupt routine that intercepts the OS booting commands, retrieves an actual file block from the remote boot server, and provides an interface program for setting up network parameters.

7. The remote boot apparatus as claimed in claim 6, wherein the core firmware is to convert disk instruction and data into a standard TCP/IP packet.

8. A remote boot interface card to be installed in a computer, the remote boot interface card comprising:
- a central processor responsible for system control, processing instructions of a core firmware and controlling data flow;
- the core firmware, in conjunction with the central processor, responsible for packing and recording data and interrupt requests, unpacking data packets, verifying the accuracy of the data packets, and automatically recovering data packet;
- a bi-directional buffer, connected to a first input/output port of the central processor, to save disk and data request commands from a local computer and data responded from a remote boot server;
- a network interface, connected to a second input/output port of the central processor, for linking to the remote boot server to transmit and receive the data packets wherein the transmitting: and receiving data packets uses an iSCSI (Internet Small Computer Systems Interface) protocol;
- a boot firmware checking connection status between the local computer and the remote boot server, wherein the remote boot server declares the available remote disk devices; and
- registering identification information of the available remote disk devices in a boot connection vector (BCV) table of the system BIOS; and
- the boot firmware, which is applied to assist booting of an operating system (OS) for the computer, provides an interrupt routine that intercepts the OS booting commands, retrieves an actual file block from the remote boot server, and provides an interface program for setting up network parameters.

9. The remote boot interface card as claimed in claim 8, wherein the core firmware is to convert disk instruction and data into a standard TCP/IP packet.

* * * * *